United States Patent
Claesson et al.

(10) Patent No.: US 12,050,473 B2
(45) Date of Patent: Jul. 30, 2024

(54) METHODS, CONTROL DEVICES AND VEHICLES FOR AUTHENTICATION OF TRANSPORT MISSIONS

(71) Applicant: Scania CV AB, Södertälje (SE)

(72) Inventors: André Claesson, Tullinge (SE); Linus Ährlig, Västerhaninge (SE); Robert Sjödin, Nyköping (SE); Sami Teppola, Nykvarn (SE); Mikko Kallio, Hölö (SE); Tomas Skeppström, Södertälje (SE); Morgan Colling, Hölö (SE)

(73) Assignee: Scania CV AB, Södertälje (SE)

(*) Notice: Subject to any disclaimer, the term of this patent is extended or adjusted under 35 U.S.C. 154(b) by 412 days.

(21) Appl. No.: 17/297,556

(22) PCT Filed: Oct. 30, 2019

(86) PCT No.: PCT/SE2019/051086
§ 371 (c)(1),
(2) Date: May 27, 2021

(87) PCT Pub. No.: WO2020/117110
PCT Pub. Date: Jun. 11, 2020

(65) Prior Publication Data
US 2022/0043460 A1    Feb. 10, 2022

(30) Foreign Application Priority Data

Dec. 7, 2018  (SE) .................... 1851521-3

(51) Int. Cl.
*G05D 1/02*    (2020.01)
*G05D 1/00*    (2006.01)
(Continued)

(52) U.S. Cl.
CPC ......... *G05D 1/0287* (2013.01); *H04L 9/3239* (2013.01); *H04L 9/3247* (2013.01);
(Continued)

(58) Field of Classification Search
CPC ...... G05D 1/0287; G05D 1/00; H04L 9/3239; H04L 9/3247; H04L 9/50; H04L 2209/84;
(Continued)

(56) References Cited

U.S. PATENT DOCUMENTS 9,663,226 B2 *   5/2017  Canavor ............. H04L 63/0823
2016/0280370 A1 * 9/2016  Canavor ............. H04L 63/0823
(Continued)

FOREIGN PATENT DOCUMENTS

JP    2951946 B1     9/1999
WO    2017180382 A1  10/2017
(Continued)

OTHER PUBLICATIONS

Scania CV AB, International Patent Application No. PCT/SE2019/051086, International Preliminary Report on Patentability, Jun. 8, 2021.
(Continued)

*Primary Examiner* — Baotran N To
(74) *Attorney, Agent, or Firm* — Moore & Van Allen PLLC; W. Kevin Ransom

(57) ABSTRACT

A method for enabling authentication of transport missions, performed in a control device of a member of a group comprising a plurality of autonomous vehicles and an off-board system. Each member in the group comprises a cryptographic function known by all other members. The method comprises signing, using the cryptographic function, information defining at least one transport mission to be performed by at least one of the autonomous vehicles in the group; and sending the signed information to a plurality of the other members of the group, in order to request them to authenticate the transport mission. The disclosure also relates to a corresponding method for authenticating transport missions, to control devices implementing the methods, to computer programs, to computer-readable storage mediums, and to autonomous vehicles.

18 Claims, 6 Drawing Sheets

(51) Int. Cl.
*H04L 9/32* (2006.01)
*H04W 4/40* (2018.01)
*H04L 9/00* (2022.01)

(52) U.S. Cl.
CPC ................. *H04W 4/40* (2018.02); *H04L 9/50* (2022.05); *H04L 2209/84* (2013.01)

(58) Field of Classification Search
CPC ......... H04L 63/126; H04L 9/32; H04L 63/08; H04L 63/14; H04W 4/40; H04W 12/06; H04W 12/08; H04W 12/12; G06Q 50/30; G06Q 10/08; B60W 30/00; B64U 2201/10
See application file for complete search history.

(56) References Cited

U.S. PATENT DOCUMENTS

| | | | |
|---|---|---|---|
| 2016/0280371 A1 | 9/2016 | Canavor et al. | |
| 2016/0285863 A1* | 9/2016 | Canavor | B64C 39/024 |
| 2016/0285864 A1* | 9/2016 | Canavor | H04W 12/069 |
| 2018/0068567 A1 | 3/2018 | Gong et al. | |
| 2018/0198779 A1* | 7/2018 | Canavor | H04L 63/123 |

FOREIGN PATENT DOCUMENTS

| | | |
|---|---|---|
| WO | 2018094554 A1 | 5/2018 |
| WO | 2018223125 A1 | 12/2018 |

OTHER PUBLICATIONS

Keane, S., Using blockchain to manage automotive cybersecurity, Future Digital Blog, Nov. 20, 2016, 7 pages.
Dorri, A., et al., BlockChain: A Distributed Solution to Automotive Security and Privacy, 2017, 7 pages.
Scania CV AB, International Patent Application No. PCT/SE2019/051086, International Search Report, Feb. 4, 2020.
Scania CV AB, International Patent Application No. PCT/SE2019/051086, Written Opinion, Feb. 4, 2020.
Scania CV AB, Swedish Patent Application No. 1851521-3, Office Action, Aug. 23, 2019.
Scania CV AB, Swedish Patent Application No. 1851521-3, Office Action, Feb. 4, 2020.
Scania CV AB, European Patent Application No. 19893673.4, Extended European Search Report, Jul. 26, 2022.
Scania CV AB, European Patent Application No. 19893673.4, Communication pursuant to Article 94(3) EPC, Feb. 28, 2024.

* cited by examiner

METHODS, CONTROL DEVICES AND VEHICLES FOR AUTHENTICATION OF TRANSPORT MISSIONS

CROSS-REFERENCE TO RELATED APPLICATIONS

This application is a National Stage Patent Application (filed under 35 § U.S.C. 371) of PCT/SE2019/051086, filed Oct. 30, 2019 of the same title, which, in turn claims priority to Swedish Patent Application No. 1851521-3 filed Dec. 7, 2018 of the same title; the contents of each of which are hereby incorporated by reference.

FIELD OF THE INVENTION

The present disclosure relates to techniques in the context of vehicles, and to methods for enabling authentication of transport missions, and corresponding methods for authenticating transport missions. The disclosure also relates to corresponding control devices, computer programs and computer-readable storage mediums for performing the proposed methods, and to autonomous vehicles comprising such control devices.

BACKGROUND

An autonomous vehicle may be defined as a vehicle that can guide itself without human conduction. An autonomous vehicle is also known as a driverless vehicle, a robot vehicle or a self-driving vehicle.

Autonomous vehicles potentially provide a plurality of advantages for society. Costs may be reduced as the vehicles are driverless and their operation is independent from regulations on driver hours. Autonomous vehicles use a variety of sensors to perceive their surroundings in order to navigate and avoid obstacles. The extensive sensing system potentially increase safety as the sensors are normally always attentive, compared to human drivers that may be distracted by other matters.

However, autonomous driving is also facing problems. The autonomous vehicles often have a high degree of connectivity, and are typically connected to the infrastructure, for example traffic management systems, other vehicles and the internet. The connectivity makes the autonomous vehicle vulnerable to malicious attakeicks, that may compromise the vehicle and endanger the safety of the vehicle, load (if present) and passengers. The article "BlockChain: A Distributed Solution to Automotive Security and Privacy", Ali Dorri et al, IEEE Communications Magazine, describes a BlockChain-based architecture for automotive security and privacy. Here, each vehicle is connected to an overlay network where a public Block Chain is managed by the overlay nodes, such as smart vehicles, car manufacturers, vehicle assembly lines etc. Each vehicle is equipped with a wireless vehicle interface and a local storage. The storage is used to store privacy sensitive data, e.g. location and maintenance history. The overlay network may be used to send data from a vehicle to an insurance company, or for remote software updates, in a secure way. Thus, the proposed architecture is implemented using public block chains.

Autonomous vehicles typically retrieve new missions from an off-board system. Details of a mission, such as final destination and time schedule, is typically included in the mission data. An autonomous vehicle may potentially retrieve an erroneous mission from a malicious sender and be hijacked by unwittingly driving to a destination defined by the erroneous mission.

SUMMARY OF THE INVENTION

It is an object of the disclosure to alleviate at least some of the drawbacks with the prior art. It is a further object to provide a method for securing that only authentic transport missions are executed by an autonomous vehicle.

These objects and others are at least partly achieved by the independent claims, and by the embodiments according to the dependent claims.

According to a first aspect, the disclosure relates to a method for enabling authentication of transport missions. The method is performed in a control device of a member of a group comprising a plurality of autonomous vehicles and an off-board system. Each member in the group comprises a cryptographic function known by all other members. The method comprises signing, using the cryptographic function, information defining at least one transport mission to be performed by at least one of the autonomous vehicles in the group. The method further comprises sending the signed information to a plurality of the other members of the group, in order to request them to authenticate the transport mission.

The method ensures that the at least one transport mission bears a signature of the sender, such that a receiver member is enabled to verify the sender of the transport mission. As the signed information is sent to a plurality of the other members, the authenticity of the transport mission may be verified by a plurality of members, which may detect if the transport mission is unauthentic. Thereby, the reliability of the authentication is increased.

According to a second aspect, the disclosure relates to a control device of a member of a group comprising a plurality of autonomous vehicles and an off-board system, for authorizing execution of transport missions. Each member in the group comprises a cryptographic function known by all other members. The control device is configured to perform the method according to the first aspect.

According to a third aspect, the disclosure relates to a method for authenticating transport missions. The method is performed by a control device of a member of a group comprising a plurality of autonomous vehicles and an off-board system. Each member in the group comprises a cryptographic function known by all other members. The method comprises receiving, from a member in the group, signed information defining at least one transport mission to be performed by at least one of the autonomous vehicles in the group. The method also comprises verifying the authenticity of the transport mission, using the cryptographic function.

The method provides a method for authenticating transport missions of an autonomous vehicle. It can thereby be ensured that transport missions for an autonomous vehicle are authentic.

According to a fourth aspect, the disclosure relates to a control device of a member of a group comprising a plurality of autonomous vehicles and an off-board system, for authenticating transport missions. Each member in the group comprises a cryptographic function known by all other members. The control device is configured to perform the method according to the third aspect.

According to a fifth aspect, the disclosure relates to an autonomous vehicle comprising a control device according to the second aspect, and/or a control device according to the fourth aspect.

According to a sixth aspect, the disclosure relates to a computer program comprising instructions which, when the program is executed by a control device, cause the control device to carry out the method according to the first aspect.

According to a seventh aspect, the disclosure relates to a computer-readable storage medium comprising instructions which, when executed by a control device, cause the control device to carry out the method according to the first aspect.

According to an eight aspect, the disclosure relates to a computer program comprising instructions which, when the program is executed by a control device, cause the control device to carry out the method according to the second aspect.

According to a ninth aspect, the disclosure relates to a computer-readable storage medium comprising instructions which, when executed by a control device, cause the control device to carry out the method according to the second aspect.

DETAILED DESCRIPTION

The following description will explain methods, for enabling authentication of transport missions, from a mission sender (assigner) perspective, and methods for authenticating transport missions, from a mission receiver (assignee) perspective. The methods are typically performed by control devices of members in a group of members. The sender is typically an off-board system, that signs and communicates new missions to vehicles in the group. The new missions are communicated to a plurality of, or all, the other members of the group. When a member receives a signed mission, the member tries to verify the authenticity of the transport mission. Thus, each member that receives a transport mission tries to verify the authenticity of it, and hence, in some sense all members tries to verify the authenticity together.

The methods provide a secure way of verifying that transport missions are authentic. Thereby, malicious transport missions will be stopped from being executed, as they will never be authenticated.

Figure 1:
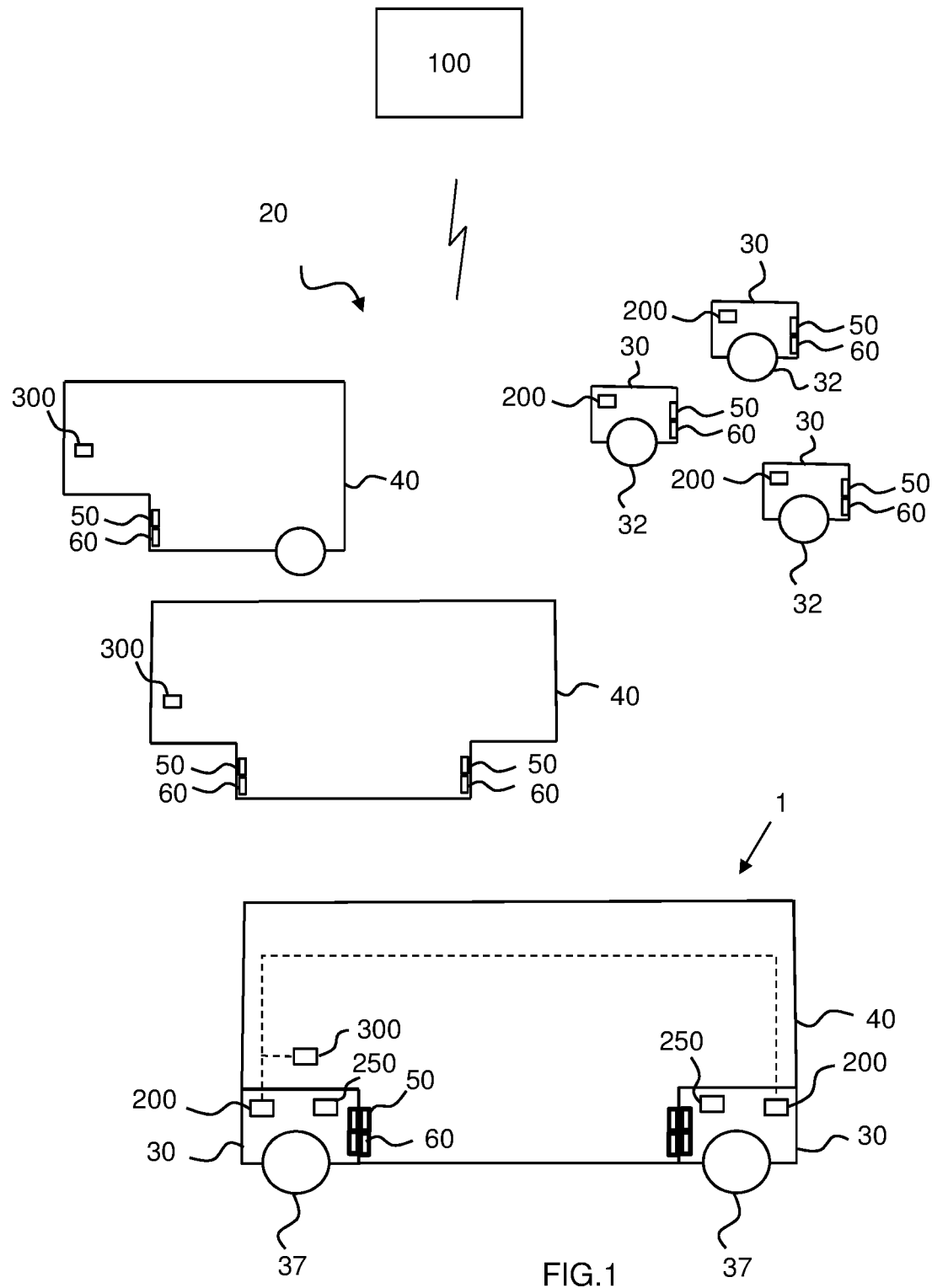
FIG. 1 illustrates a set of modules, a vehicle assembled from the set of modules, and an offboard system.
Figure 2:
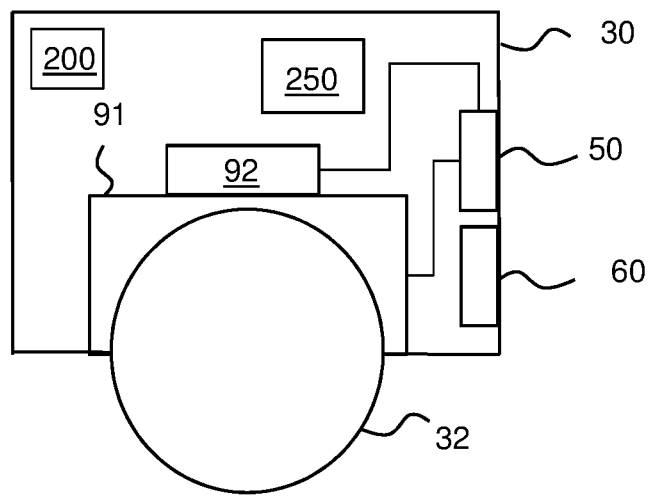
FIG. 2 schematically illustrates a drive module in further detail in a side view.

Before the methods are explained, an example of an autonomous vehicle, and assembling of such a vehicle, will be described. Thus, this exemplary vehicle may be one of the members in the group. The vehicle that will be described with reference to the FIGS. 1 and 2 is a modular vehicle. The modular vehicles described herein are typically configured to operate autonomously.

FIG. 1 illustrates an example set of modules 20 for assembling a vehicle 1. An offboard system and an example of an assembled vehicle 1 is also illustrated. The set of modules 20 comprises a plurality of drive modules 30 and a plurality of functional modules 40. The drive modules' 30 main function is typically to drive (e.g. propel, steer and brake) a vehicle 1. The drive modules 30 comprises a pair of wheels 37 and are configured to be autonomously operated. The functional modules 40 are configured to perform a certain function such as to carry a load, e.g. goods or people.

Each module 30, 40 in the set of modules 20 comprises at least one interface 50 releasably connectable to a corresponding interface 50 on another module 30, 40. Since the drive module 30 may be configured to be operated as an independently driven unit by means of the control device 200, the drive module may 30 be connected with, or disconnected from, the functional module 40 without manual work.

By combining drive modules 30 and functional modules 40, different types of vehicles 1 can be achieved. Some vehicles 1 require two drive modules 30 and some vehicles 1 only require one drive module 30, depending on the structural configuration of the functional module 40. Each drive module 30 comprises a control device 200 and is configured to communicate with a control device 100 in a control center or off-board system. Each functional module 40 may comprises a control device 300 and may thus also communicate with a control device 100 in a control center or off-board system.

In some embodiments, the control device 200 of the drive module 30 is configured to communicate with the control device 300 of a functional module 40, as illustrated by dashed lines in FIG. 1. The communication between the modules 30, 40 may be wireless or conductively or by wire. The wireless communication may be directly between the modules or via the off-board system (i.e. comprising a first control device 100). The modules 30, 40 of an assembled vehicle may communicate with each other and/or the first control device via 4G, 5G, V2V (Vehicle to Vehicle), Wi-Fi or any other wireless communication means.

Considering an assembled vehicle 1 comprises two drive modules, the first control device 100 may appoint one drive module to be master drive module and the other to be slave drive module.

In this FIG. 1 the drive modules 30 are illustrated with only one interface 50, on one side of the drive module 30. However, it is to be understood that each drive module 30 may comprise a plurality of interfaces 50 for releasable connection with other modules 40. The interface(s) 50 of the drive modules 30 may be arranged on different sides of the drive module 30 and thus enable connection with other modules 30, 40 on multiple sides of the drive module 30. The interfaces 50 on the drive modules 30 and the functional modules 40 respectively, are suitably arranged on corresponding positions to enable connection between the modules 30, 40.

A drive module 30 comprises a sensor system 250 including a variety of sensors for perceiving the environment, navigate autonomously and avoid obstacles. A functional module 40 may also comprise sensors (not shown) for perceiving the environment.

FIG. 2 schematically illustrates a drive module 30 in further detail in a side view. The drive module 30 comprises at least one (only one illustrated) propulsion system 91, an energy storage device 92, an interface 50 and a control device 200. The energy storage device 92 provides energy to the propulsion system 91. The propulsion system 91 comprises at least one electrical machine, thus an electrical motor. The propulsion system(s) 91 is/are arranged to propel the pair of wheels 37 of the drive module 30.

An example of a sequence for assembly of a vehicle 1 will be described below. An operator may receive a mission from a client to transport goods from one location to another. The operator enters the information about the mission into the first control device 100 via a user interface, such as a touch screen or similar. It is pointed out that this is merely an example, and the received mission may automatically be translated and/or inputted to the first control device 100. The first control device 100 then determines which function to be performed and thus which type of vehicle 1 is required to complete the mission. In this example, the required vehicle 1 may be a truck. The first control device 100 selects which modules 30, 40 to use for the required vehicle. The type of vehicle 1 and the modules 30, 40 required to complete the mission may for example be selected based on information about the goods, the distance to travel and/or the geographical location. The first control device 100 then suitably converts the mission into a command for one or two selected drive modules 30 to physically and electrically connect with the selected functional module 40. The control devices 200 of the drive modules 30 each receives the command and converts the command to control signals for the respective drive module 30. The drive modules 30 are thereby controlled to physically and electrically connect with the functional module 40. Controlling the drive module 30 to connect with a functional module 40 may comprise controlling the drive module 30 to identify the position of the selected functional module 40 and move to that position. The position of the selected functional module 40 may be determined based on information received in the command to connect the drive module 30 with the functional module 40. Alternatively, the command to connect the drive module 30 and the functional module 40 is transmitted to both the drive module 30 and the functional module 40, whereby the functional module 40 prepares for the connection and starts transmitting a signal. The drive module 30 may then determine the position of the functional module based on this transmitted signal. The drive modules 30 are thus autonomously operated to find the selected functional module 40 and connect with that functional module 40. At least one sensor device 60 arranged at the drive modules 30 and/or the functional module 40 may be configured to sense when the physical and/or electrical connection has been performed. The at least one sensor device 60 may send a signal to the control devices 200 indicating that the connection(s) have been performed. Based on the signal from the at least one sensor device 60, the control device 200 may send a verification signal to the first control device 100 for verification of the connection(s). The first control device 100 may then generate a unique vehicle identity for the assembled vehicle 1. A vehicle 1 is thus assembled and the vehicle 1 is ready to perform the mission.

Figure 6:
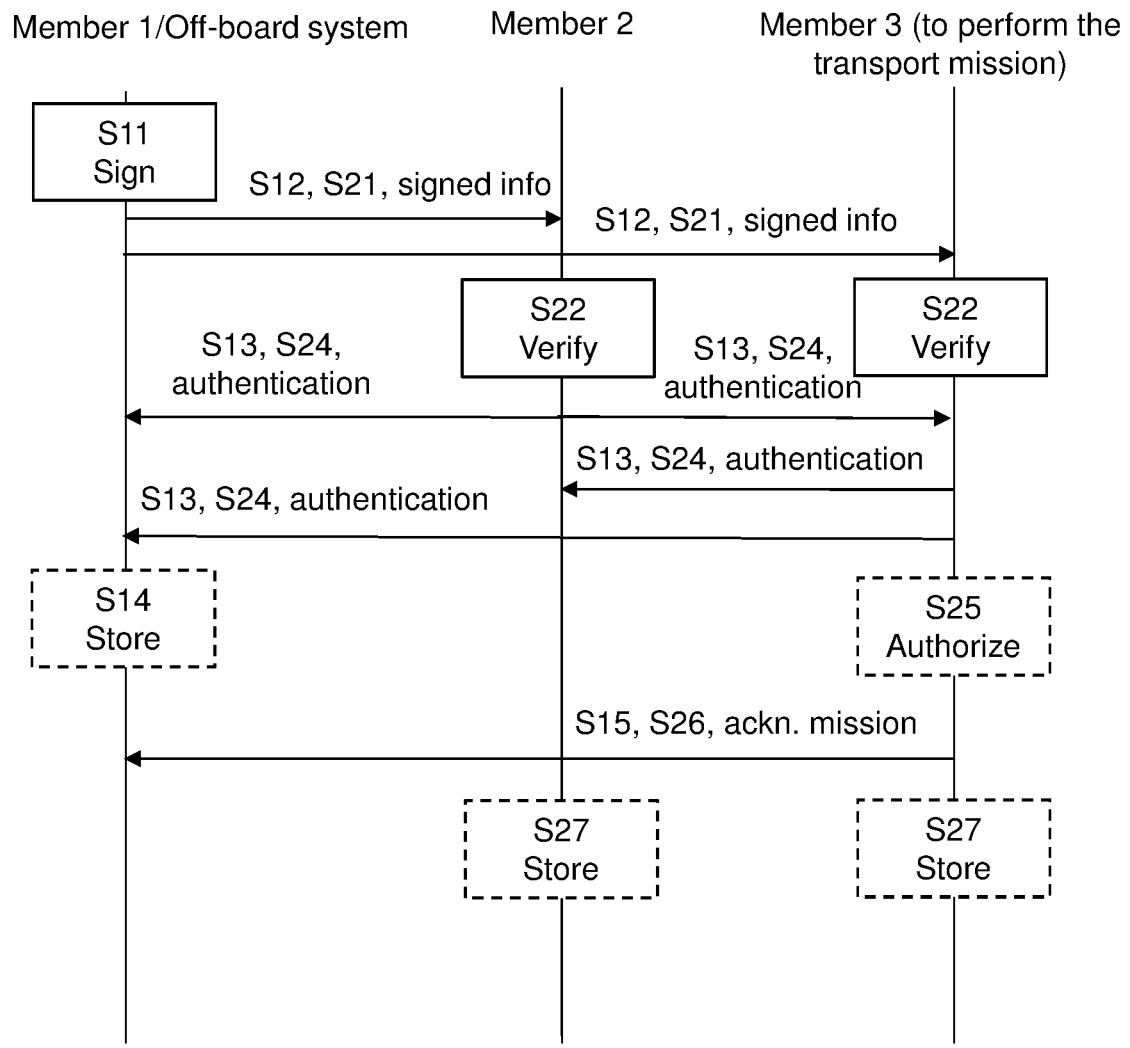
FIG. 6 illustrates a signal scheme including to successfully authenticating a transport mission and thus authorizing the at least one autonomous vehicle to perform the mission.
Figure 7:
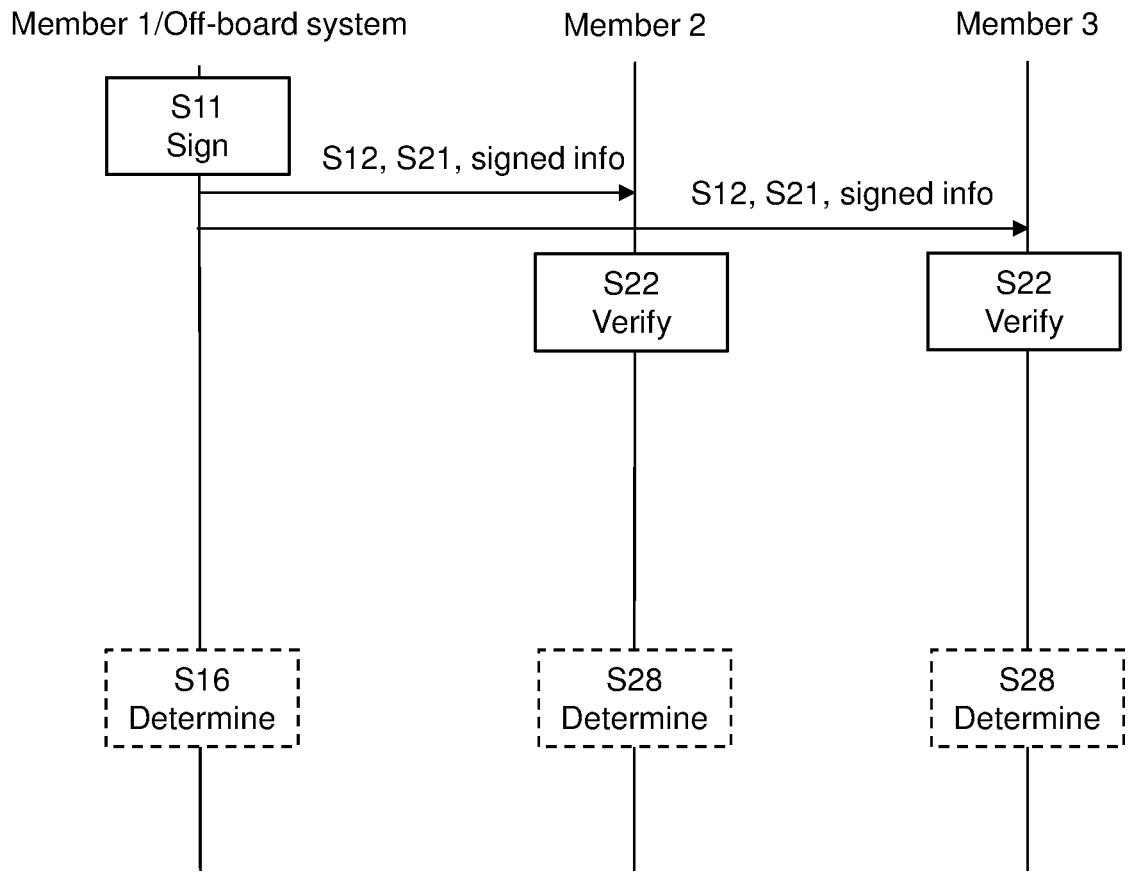
FIG. 7 illustrates a signal scheme including that the transport mission is not authenticated.

The proposed methods will now be explained with reference to the group of members in the urban setting in FIG. 3, to the methods of FIGS. 4 and 5, and to the signal schemes of FIGS. 6-8.

Figure 3:
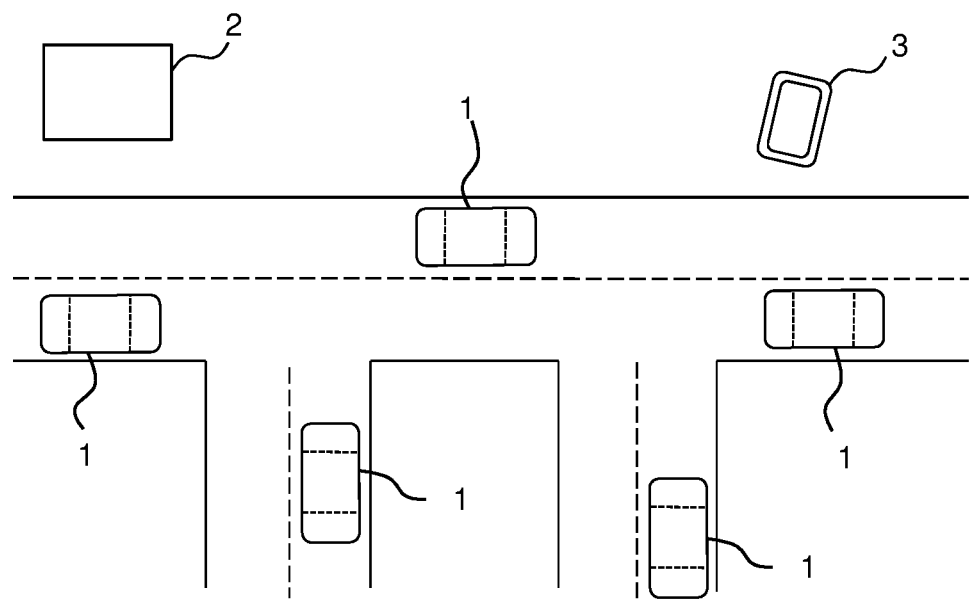
FIG. 3 illustrates a group of members comprising a plurality of autonomous vehicles and an off-board system in an urban setting.

FIG. 3 illustrates a group of members in an urban setting. The members comprise a plurality of autonomous vehicles 1, an off-board system 2, and a mobile device 3. Thus, each individual autonomous vehicle is one member, the off-board system is one member, and the mobile device 3 is another member. The illustration is merely an example, and the group may include more or fewer members. An autonomous vehicle of the plurality of autonomous vehicles is for example the vehicle 1 of FIGS. 1 and 2. Each member 1, 2, 3 comprises a wireless communication interface (130, FIG. 8; 230, FIG. 9), for communicating with other members 1, 2, 3. The vehicles 1 are operating along the streets of the urban setting for performing different transport missions, such as transporting people or load to various locations, acting as taxi or bus etc.

Figure 4:
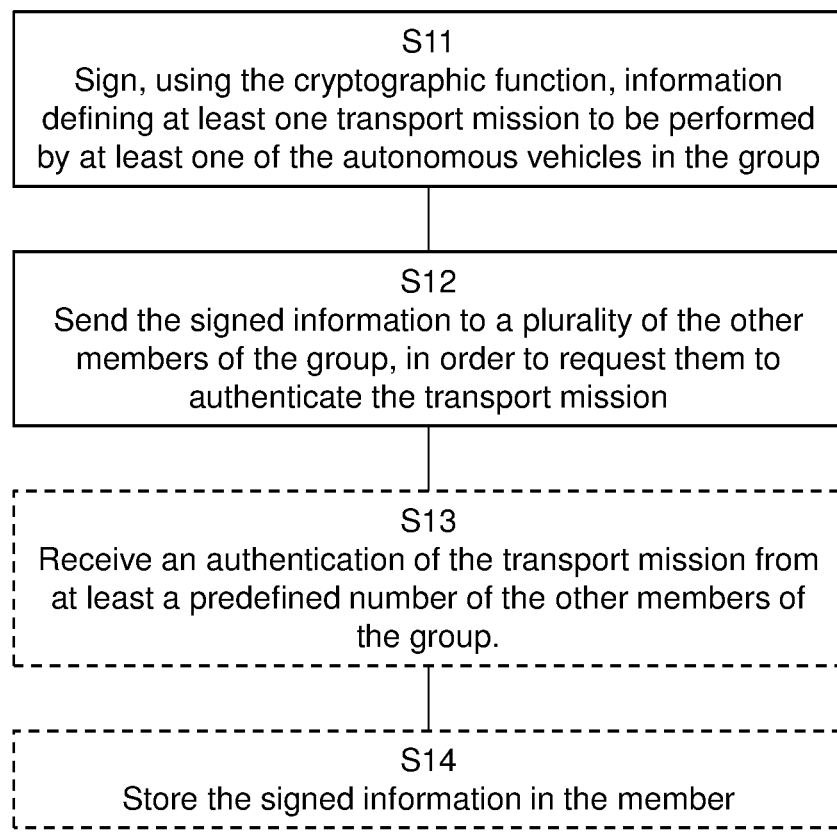
FIG. 4 illustrates a method according to the first aspect according to some embodiments.

FIG. 4 illustrates a method for enabling authentication of transport missions in a group of members, for example the group of members illustrated in FIG. 3. The method is performed in a control device 100, 200, 300 of a member. The member is for example an off-board system 2, or a mobile device 3. Each member in the group, i.e. its control device 100, 200, 300, comprises a cryptographic function known by all other members. The cryptographic function is for example a cryptographic algorithm. In some embodiments, the cryptographic function comprises a public key of a key pair, where the key pair also comprises a private key that is known by the member only. The public key of each member is then announced, e.g. exchanged, by all members in the group before the method is started. Thus, each member in the group knows the public key of all the other members. In some embodiments, the cryptographic function comprises a hash function, for example MD 5, SHA 1, SHA256, Keccak-256 or RIPEDM. The hash function takes an input of any size and creates and output of a fixed size, a hash or digest. If the same input and hash function are used, the output is always the same. Thus, the hash output can be used as a fingerprint of the sent data. The hash function is the same in all members in the group.

A cryptographic hash function may be defined by certain properties to be considered secure. Such properties include being deterministic, meaning that if you give a certain input to the hash function it will always give the same output; have a quick computation, meaning that the hash function should be able to return the hash quickly; and have a pre-image resistance, meaning that given H(A), it is infeasible to determine the input A, where H(A) is the output hash of the hash function.

One member that performs the method, here referred to as a first member, for example the off-board system 2, a computer or mobile device 3, comprises information defining at least one transport mission to be performed by at least one of the autonomous vehicles in the group. This information may be input to the off-board system via an input device by an operator. Alternatively, the operator may input such information to a computer or mobile device. The information is typically stored in a memory of the off-board system, computer or mobile device. The information defining a transport mission comprises for example data defining a route for the vehicle. The information may include a starting point, a starting time, a destination point, a destination time when the vehicle should be at the destination point, and optionally one or several waypoints. The information may also comprise details of a load included in the mission, e.g.

if passengers or cargo should be transported, and optionally what type of cargo. The information also includes information defining the identity of the vehicle that is assigned to perform the transport mission.

The method comprises signing S11, using the cryptographic function, information defining at least one transport mission to be performed by at least one of the autonomous vehicles in the group. By signing the information, a receiver of the signed information is enabled to verify the identity of the sender. The signing process includes to add a signature of the member, thus the first member, to the information, to create "signed information" comprising a signature and the information. The member uses the cryptographic function to create the signature. The signature may be created using one key of the sender's key-pair. For example, the sender encrypts the information with the sender's private key, and thereby creates a signature. Thereby, the receiver will be able to verify the identity of the sender by decrypting the "signed information" using the public key of the sender.

The signing may also include to create "wrapped and encrypted data" by combing the information with the "signed information", and encrypting it using the receiver's public key. An intruder will thereby be stopped from understanding the information, as only the receiver's private key can decrypt the "wrapped and encrypted data".

In order to reduce the amount of data sent, a cryptographic hash function may be used, as previously described, as a step in generating a signature. The actual information may then be input to the hash function, to create a hash. Then, the "signed information" will then comprise a signature plus the hash (instead of the signature plus the information). The sender of the hash is then made a trusted sender, by signing the hash using e.g. public encryption.

When the information has been signed, the member sends S12 the signed information to a plurality of the other members of the group, in order to request them to authenticate the transport mission. The sending is performed by means of the communication interface (130, FIG. 8) of the first member 2, 3. The signed information may include a request for authentication of the signed information.

By sending the signed information to a plurality of other members, the individual members can be used to authenticate the transport mission. Thereby, a plurality of objective instances can be utilized to make sure the transport mission is authentic, and the authentication becomes secure. Also, it can be detected if the transport mission is authentic, and the system (e.g. the off-board system) may react accordingly.

In some embodiments, the signing S11 comprises generating a signature, using the cryptographic function, based on information defining the mission to be performed and on information associated with previously authenticated missions performed by the autonomous vehicles in the group. Thus, by using a history of proofed, thus authenticated missions, the authentication may be even more secure. For example, a cryptographic hash function may be used, as previously described, as a step in generating a signature. Then, the information defining the current transport mission and information associated with previously authenticated transport missions, are used as input to the hash function. The hash function creates a hash as previously explained. The hash is here associated with previously authenticated transport missions, and is very difficult, if not impossible, to manipulate. As in the previous example, the signing may also include to encrypt the signature plus the information, using the receiver's public key.

In an example embodiment, the signing S11 comprises creating a block comprising information defining the mission to be performed, using the cryptographic function, for use in a block chain. A cryptographic hash function is typically used in block chain technology. A block chain is a linked list which contains data and a hash pointer which points to its previous block, hence creating the chain. The hash pointer is similar to a pointer, but in addition to include the address of the previous block, it also contains the hash of the data inside the previous block. Thereby, a history of proofed, thus authenticated, missions is obtained. When a new transport mission is obtained, a new block or "candidate block" is created by hashing, using the hash function, the information defining the transport mission and the hash of the data inside the previous block. The new "block" is also signed using e.g. public encryption and sent to other members. Thus, the sending S12 comprises sending the signed information including the block to the plurality of other members in the group.

The first member 2, 3 typically stores the signed information in the memory of its control device 100. In other words, the method comprises storing S14 the signed information in the member. In order to make sure the transport mission is authentic, the first member 2, 3 does, in some embodiments, not permanently store the signed information (e.g. in a block chain) until an authentication of the transport mission has been received from a predefined number of members. In other words, the storing S14 comprises storing the signed information in the member, for example in a block chain, in response to receiving S13 an authentication of the transport mission from at least a predefined number of the other members of the group. The predefined number is for example 50% of the plurality of the other members of the group, to which the signed information was sent to. In some other examples, the predefined number is 60%, 70%, 80% 90% or 100% of the of the plurality of the other members of the group, to which the signed information was sent to. Thereby, the process of authenticating the transport mission can be made more secure, than if only requiring authentication from one or a minor number of other members.

Figure 5:
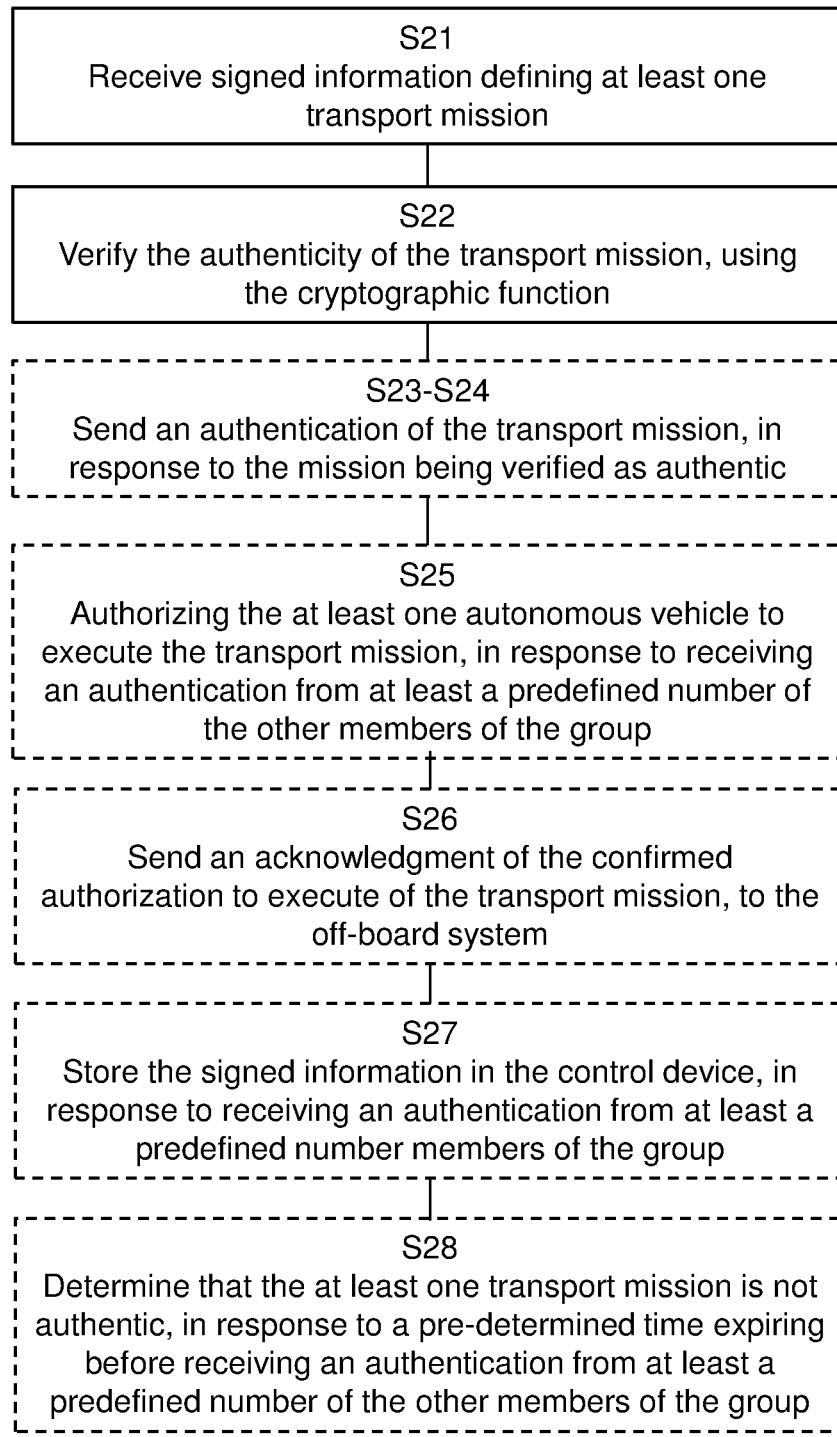
FIG. 5 illustrates a method according to the third aspect according to some embodiments.

FIG. 5 is a flowchart illustrating a method for authenticating transport missions. The one or several transport missions typically comes from a control device 100 of an off-board system, as previously explained. The method is performed by a control device 100, 200, 300 of a member of a group. The group is for example the group illustrated in FIG. 3, and the member is typically an autonomous vehicle 1 in the group. The method comprises receiving S21, from a member in the group, signed information defining at least one transport mission to be performed by at least one of the autonomous vehicles in the group. The signed information is sent e.g. from the off-board system, where the information also has been signed using a cryptographic function that is known to all members in the group. The method also comprises verifying S22 the authenticity of the transport mission, using the cryptographic function. To verify the authenticity of the transport mission includes, for example, to verify the identity of the sender. This is typically done by decrypting the signed information, by using the public key of the sender and in some cases the private key of the receiving member. For example, if the sender encrypts the information with the sender's private key, and thereby creates a signature, the receiver verifies the identity of the sender by decrypting the "signed information" using the public key of the sender.

If the signed information comprises "wrapped and encrypted data", the receiver will decrypt the "wrapped and encrypted data", using the private key of the receiver. The receiver can now see the "information", the first decrypted information, but not the "signed information", thus the signature. Thereafter, the receiver will decrypt the "signed information" using the public key of the sender and see the "information" a second time. This later decrypted "information" can be compared with the first decrypted "information". If they match, it can be assured that the message was indeed sent by the identified sender. The data matching also ensures that the message is not corrupted.

If the "signed information" comprises a signature plus a hash (instead of the signature plus the information), the receiver may then use the same cryptographic hash function that was used at the sender's side, to hash the received information. If the resulting calculated hash on the receiver side is the same as the sent hash, then the information match and it can be assured that the message was indeed sent by the identified sender.

If the hash is calculated also based on information associated with previously authenticated transport missions, it is very difficult, if not impossible, to manipulate. The receiver already comprises the information associated with previously authenticated transport missions. The receiver will decrypt the received data as previously explained and use the history of information associated with previously authenticated transport missions together with the newly received, decrypted information, as input to the hash function. If the resulting calculated hash on the receiver side is the same as the received hash, then they match and it can be assured that the message was indeed sent by the identified sender.

The authenticity of the transport mission may thus be verified in a plurality of ways by each member. For example, the transport mission may be verified as authentic if the identity of the sender can be verified. This verification may be enhanced by also encrypting the signed information, by hashing the information, and/or by using a history of authenticated transport missions combined with the new transport mission.

The authentication may also include to perform a plausibility check of the received information. This check may include to compare details of the information with previously received transport missions. If for example the previous transport mission for a vehicle had a destination in Finland for one day, and a new transport mission for the same vehicle has a starting point in Spain the next day, the transport mission may be determined as invalid, as there is no possibility for the vehicle to be at the starting point in time. The group of members may also have general rules that all members are aware of. These rules may for example dictate an area where the members are allowed to operate. If a transport mission indicates a position outside this area, the transport mission may be determined to be invalid.

Thus, each member that has received the signed information, tries to authenticate the signed information. If the member succeeds, an authentication is sent to the at least one autonomous vehicle that is indicated as the vehicle that is to perform the transport mission. Thus, according to some embodiments, the method comprises sending S23 an authentication of the transport mission to the at least one autonomous vehicle, in response to the mission being verified as authentic. Thereby the at least one autonomous vehicle may be enabled to know if the transport mission is authentic.

The member that receives the signed information, may be the at least one autonomous vehicle that also is to perform the transport mission. In other words, in some embodiments, the control device 200, 300 that performs the method is arranged in the at least one autonomous vehicle. Thus, the at least one autonomous vehicle itself performs a check of the transport mission can be verified as authentic. However, in order for the at least one autonomous vehicle to actually be authorized to perform the transport mission, the at least one autonomous vehicle may also be required to receive a predefined number of individual authentications, besides the own authentication. In other words, in some embodiments, the method comprises authorizing S25 the at least one autonomous vehicle to execute the transport mission, in response to receiving an authentication of the transport mission from at least a predefined number of the other members of the group. The predefined number is for example 50% of the plurality of the other members of the group, to which the signed information was sent to. In some other examples, the predefined number is 60%, 70%, 80% 90% or 100% of the of the plurality of the other members of the group, to which the signed information was sent to. Thereby, the process of authenticating the transport mission can be made more secure, than if only requiring authentication from one or a minor number of other members. The percentage may instead be a predefined number, such as 2, 3, 5 or 10 individual members. However, it may not be required that the at least one autonomous vehicle verifies the transport mission as authentic itself, for the transport mission to be executed by the at least one autonomous vehicle.

If the at least one autonomous vehicle is authorized to execute the transport mission, the off-board system may be notified that the at least one autonomous vehicle is aware of the authorization to execute. Thus, in some embodiments, the method comprises sending S26, to the off-board system, an acknowledgment of the authorization to execute the transport mission by the at least one autonomous vehicle. The off-board system receives the acknowledgement and typically stores a representation of it in the control device 100.

Apart from sending an authentication to the at least one autonomous vehicle that is to perform the transport mission, the authentication may be sent to the other members in the group. Thus, in some embodiments, the method comprises sending S24 an authentication of the transport mission to a plurality of the members in the group, in response to the mission being verified as authentic.

The members in the group may also individually monitor how many verified authentications the members receive. If a predefined number of verified authentications is received by a member, the signed information is stored in the member. In other words, the method comprises storing S27 the signed information in the control device 100, 200, 300 in response to receiving an authentication of the transport mission from at least a predefined number of the other members of the group. Thereby, the plurality of members will comprise information of all authenticated transport missions. In some embodiments, the storing S27 comprises adding the signed information to a block chain in the control device 100, 200, 300. Thereby, the signed information will be part of a linked list that is very hard to manipulate. As this linked list is the same in all the plurality of members in the group, this link may also be used in the verification of the authenticity of the transport missions, as previously explained. The linked list, thus the block chain, includes a plurality of blocks where each block comprises the hash of the previous block. If you want to change an entry in the ledger retroactively, you have to calculate a new hash not only for the block it's in but also for every subsequent block. And it has be made faster than the other nodes can add new blocks to the chain. So if you are not faster, any block that is added will conflict with existing ones, and the other nodes will automatically reject the alterations. This is what makes the blockchain tamperproof, or "immutable".

The members will, according to some embodiments, await authentications from the other members in the group. To avoid that the authentication process takes too long time, or if the transport mission has been compromised and cannot be authenticated, the member may implement a timer. Thus, according to some embodiments, the method comprises determining S28 that the at least one transport mission is not authentic, in response to a pre-determined time expiring before receiving an authentication from at least a predefined number of the other members of the group. Then, the signed information will not be saved in the member where the method is performed. If the determining is performed in the at least one autonomous vehicle that is considered for the transport mission, the at least one vehicle will not be authorized to execute the transport mission. The timer is for exampled triggered to start counting at the time of sending the signed information, or at the time of receiving a request for signing a transport mission.

If a member is added to the group, for example a new autonomous vehicle, or if an old member has been inactive for a while, e.g. turned off, and is now active again, the member, in an example embodiment, receives a copy of the presently available blockchain in another active member, e.g. the off-board system.

The method will now be explained with reference to the signal schemes of FIGS. 6 and 7. In FIG. 7, an example group of three members is illustrated. The group comprises a first member (Member 1) being an off-board system, a second member (Member 2) being a first autonomous vehicle, and a third member (Member 3) being a second autonomous vehicle and also the autonomous vehicle that is to perform a new, not yet authenticated transport mission. An example scenario of a successful authentication will now be explained with reference to the signal scheme in FIG. 6.

A user enters a new transport assignment to the first member. The new transport mission is intended for the third member. The first member signs information defining the new transport mission, optionally using also a history of authenticated transport missions, using public encryption (corresponding to step S11 in FIG. 4) and sends the signed information to the second member (corresponding to step S12 in FIG. 4) and to the third member (corresponding to step S12 in FIG. 4). The encryption is performed using at least public keys of the second member and third member, respectively. The signed information is received by the second member (corresponding to step S21 in FIG. 5). The second member verifies the authenticity of the transport mission (corresponding to step S22 in FIG. 5). The transport mission is verified as authentic, and the second member sends an authentication to the off-board system and to the third member, respectively (corresponding to step S24 in FIG. 5). In an alternative embodiment, the second member for example only sends an authentication to the member that is to perform the transport mission, here the third member. This would then correspond to step 23 in FIG. 5.

The signed information is also received by the third member (corresponding to step S21 in FIG. 5). The third member verifies the authenticity of the transport mission (corresponding to step S22 in FIG. 5). The third member also detects that the transport mission is indented for itself. The transport mission is verified as authentic by the third member, and the third member sends an authentication to the off-board system and to the second member, respectively (corresponding to step S24 in FIG. 5). In response to the authorization from the second member and the self-performed authorization, the third member authorizes itself to execute the transport mission (corresponding to step S25 in FIG. 5). The predetermined number is thus here one (1) as the group is small and only for illustration. The third member send an acknowledgement of the authorization to execute the transport mission to the first member (corresponding to step S26 in FIG. 5), and stores the signed information (corresponding to step S27 in FIG. 5)

The second member has thus received an authentication from the third member, and in response to this authentication, it stores the signed information in the second member (corresponding to step S27 in FIG. 5).

The first member has received an authentication from the second member and the third member. In response to one or both authentications, it stores the signed information in the first member (corresponding to step S14 in FIG. 4). The first member also receives the acknowledgement of the transport mission from the third member in a step S15, and in response thereto stores information relating to the acknowledgement.

An example scenario of an unsuccessful authentication will now be explained with reference to the signal scheme in FIG. 7. As in the scenario in FIG. 6, the first member signs information defining the new transport mission, optionally using also a history of authenticated transport missions, using public encryption (corresponding to step S11 in FIG. 4) and sends the signed information to the second member (corresponding to step S12 in FIG. 4) and to the third member (corresponding to step S12 in FIG. 4). The second member and the third member try to verify the authenticity of the transport mission but are not successful. As no authentication from any other member has been received within a predetermined time, the transport mission is determined to be not authentic, and thus not valid (corresponding to step S28 in FIG. 5). Also, as no authentications are received to the first member, the transport mission is determined to be not authentic, and thus not valid (corresponding to a step S16). The first member may now try to repeat the method and send the signed information of the transport mission again.

Figure 8:
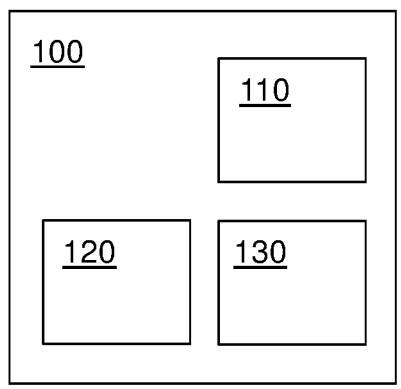
FIG. 8 illustrates a control device included in an off-board system.

Now turning to FIG. 8 which illustrates another example implementation a control device configured to implement the proposed method. In this example the control device is embodied as a control device 100 e.g. in an off-board system.

In some embodiments, the control device 100 is a "unit" in a functional sense. Hence, in some embodiments the control device 100 is a control arrangement comprising several physical control devices that operate in corporation. The control device 100 comprises hardware and software. The hardware basically comprises various electronic components on a Printed Circuit Board, PCB. The most important of those components is typically a processor 110 along with a memory 120.

The control device 100 also comprises a communication interface 130, enabling the control device 100 to communicate with the modules 30, 40 of the modular vehicle 1 and with other external entities such as traffic systems etc. The communication interface 130 e.g. enables internet connection. The communication of the control device 100 is e.g. implemented using Internet Protocol, IP.

The control device 100, or more specifically the processor 110 of the control device 100, is configured to cause the control device 100 to perform all aspects of the method described above and below, and in particular the method according to the first aspect. Thus, the control device 100 is configured for enabling authentication of transport missions. This is typically done by running computer program code stored in the memory 120 in the processor 110 of the control device 100. Thus, the computer program comprises instructions which, when the program is executed by a control device, cause the control device to carry out the method according to any one of the embodiments as described herein. The program may be stored on a computer-readable storage medium comprising instructions which, when executed by a control device, cause the control device to carry out the method according to any one of the embodiments as described herein.

Figure 9:
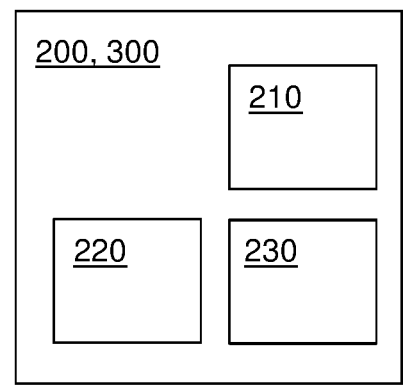
FIG. 9 illustrates a control device included in a member such as a vehicle.

Now turning to FIG. 9 which illustrates an example implementation a control device configured to implement the proposed method according to the third aspect. In this example the control device is embodied as a control device 200, 300 for use in a vehicle 1, such as the modular vehicle described in FIG. 1 to FIG. 3. In some embodiments, the control device 200, 300 is a "unit" in a functional sense. Hence, in some embodiments the control device 200, 300 is a control arrangement comprising several physical control devices that operate in corporation. The control device 200, 300 comprises hardware and software. The hardware basically comprises various electronic components on a Printed Circuit Board, PCB. The most important of those components is typically a processor 210 along with a memory 220.

The control device 200, 300 also comprises one or more communication interfaces 230, enabling the control device 200, 300 to communicate with other modules 30, 40 of the modular vehicle 1, or of other vehicles. The communication between the modules is as mentioned above wireless, conductive or wired. Wired communication may be implemented standard protocols such as Controller Area Network, CAN. CAN is a robust vehicle bus standard designed to allow microcontrollers and devices to communicate with each other in applications without a host computer. Wireless communication between the modules may be implemented using any short-range communication protocol such as Bluetooth or 802.11.

The one or more communication interfaces 230 is also configured to enable wireless communication with the control device 100, i.e. with the off-board system. The wireless communication between the control device 200, 300 in the vehicle and the control device 100 in the off-board system is e.g. implemented using 4G, 5G, V2V (Vehicle to Vehicle) or any other suitable wireless communication protocol.

The control device 200, 300, or more specifically the processor 210 of the control device 200, 300, is configured to cause the control device 200, 300 to perform all aspects of the method described above and below, and in particular the method according to the third aspect. Thus, the control device 200, 300 is configured for authentication of transport missions. This is typically done by running computer program code stored in the memory 220 in the processor 210 of the control device 200, 300. Thus, the computer program comprises instructions which, when the program is executed by a control device, cause the control device to carry out the method according to any one of the embodiments as described herein. The program may be stored on a computer-readable storage medium comprising instructions which, when executed by a control device, cause the control device to carry out the method according to any one of the embodiments as described herein.

The terminology used in the description of the embodiments as illustrated in the accompanying drawings is not intended to be limiting of the described method; control arrangement or computer program. Various changes, substitutions and/or alterations may be made, without departing from invention embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A method for enabling authentication of transport missions, performed in a control device of a member of a group comprising a plurality of autonomous vehicles and an off-board system, wherein each member in the group comprises a cryptographic function known by all other members, the method comprising:
   signing, using the cryptographic function, information defining at least one transport mission to be performed by at least one of the autonomous vehicles in the group, wherein the signing comprises generating a signature, using the cryptographic function, based on information defining the mission to be performed and on information associated with previously authenticated missions performed by the autonomous vehicles in the group; and
   sending the signed information to a plurality of the other members of the group, in order to request the plurality of the other members of the group to authenticate the transport mission.

2. The method according to claim 1, comprising storing the signed information in the member.

3. The method according to claim 2, wherein the storing comprises storing the signed information in a block chain, in response to receiving an authentication of the transport mission from at least a predefined number of the other members of the group.

4. The method according to claim 1, wherein the signing comprises creating a block comprising information defining the mission to be performed, using the cryptographic function, for use in a block-chain, and wherein the sending comprises sending the signed information including the block to the plurality of members in the group.

5. A computer program product comprising a computer program code stored on a non-transitory computer-readable medium, said computer program product used for enabling authentication of transport missions, performed in a control device of a member of a group comprising a plurality of autonomous vehicles and an off-board system, wherein each member in the group comprises a cryptographic function known by all other members, said computer program code comprising computer instructions to cause one or more control devices to perform the following operations:
   signing, using the cryptographic function, information defining at least one transport mission to be performed by at least one of the autonomous vehicles in the group, wherein the signing comprises generating a signature, using the cryptographic function, based on information defining the mission to be performed and on information associated with previously authenticated missions performed by the autonomous vehicles in the group; and sending the signed information to a plurality of the other members of the group, in order to request the plurality of the other members of the group to authenticate the transport mission.

6. A control device, for enabling authentication of transport missions, where the control device is a control device of a member of a group comprising a plurality of autonomous vehicles and an off-board system, wherein each member in the group comprises a cryptographic function known by all other members, wherein the control device is configured to perform the following operations:

signing, using the cryptographic function, information defining at least one transport mission to be performed by at least one of the autonomous vehicles in the group, wherein the signing comprises generating a signature, using the cryptographic function, based on information defining the mission to be performed and on information associated with previously authenticated missions performed by the autonomous vehicles in the group; and sending the signed information to a plurality of the other members of the group, in order to request the plurality of the other members of the group to authenticate the transport mission.

7. A method for authenticating transport missions, performed by a control device of a member of a group comprising a plurality of autonomous vehicles and an off-board system, wherein each member in the group comprises a cryptographic function known by all other members, wherein the method comprises:

receiving, from a member in the group, signed information defining at least one transport mission to be performed by at least one of the autonomous vehicles in the group, wherein the signed information comprises a history of authenticated transport missions combined with the new transport mission; and verifying the authenticity of the transport mission using the cryptographic function.

8. The method according to claim 7, further comprising sending an authentication of the transport mission to the at least one autonomous vehicle, in response to the mission being verified as authentic.

9. The method according to claim 7, comprising sending an authentication of the transport mission to a plurality of the members in the group, in response to the mission being verified as authentic.

10. The method according to claim 7, wherein method comprises:

authorizing the at least one autonomous vehicle to execute the transport mission, in response to receiving an authentication of the transport mission from at least a predefined number of the other members of the group.

11. The method according to claim 10, wherein the method comprises:

sending, to the off-board system, an acknowledgment of the authorization to execute the transport mission by the at least one autonomous vehicle.

12. The method according to claim 7, comprising:

storing the signed information in the control device in response to receiving an authentication of the transport mission from at least a predefined number of the other members of the group.

13. The method according to claim 12, wherein the storing comprises adding the signed information to a block chain in the control device.

14. The method according to claim 7, comprising:

determining that the at least one transport mission is not authentic, in response to a pre-determined time expiring before receiving an authentication from at least a predefined number of the other members of the group.

15. A computer program product comprising computer program code stored on a non-transitory computer-readable medium, said computer program product used for authenticating transport missions, performed by a control device of a member of a group comprising a plurality of autonomous vehicles and an off-board system, wherein each member in the group comprises a cryptographic function known by all other members, said computer program code comprising computer instructions to cause one or more control devices to perform the following operations:

receiving, from a member in the group, signed information defining at least one transport mission to be performed by at least one of the autonomous vehicles in the group, wherein the signed information comprises a history of authenticated transport missions combined with the new transport mission; and verifying the authenticity of the transport mission, using the cryptographic function.

16. A control device for authenticating transport missions, where the control device is a control device of a member of a group comprising a plurality of autonomous vehicles and an off-board system, wherein each member in the group comprises a cryptographic function known by all other members, wherein the control device is configured to perform the following operations:

receiving, from a member in the group, signed information defining at least one transport mission to be performed by at least one of the autonomous vehicles in the group, wherein the signed information comprises a history of authenticated transport missions combined with the new transport mission; and verifying the authenticity of the transport mission, using the cryptographic function.

17. An autonomous vehicle comprising a control device for enabling authentication of transport missions, where the control device is a control device of a member of a group comprising a plurality of autonomous vehicles and an off-board system, wherein each member in the group comprises a cryptographic function known by all other members, wherein the control device is configured to perform the following operations:

signing, using the cryptographic function, information defining at least one transport mission to be performed by at least one of the autonomous vehicles in the group, wherein the signing comprises generating a signature, using the cryptographic function, based on information defining the mission to be performed and on information associated with previously authenticated missions performed by the autonomous vehicles in the group; and sending the signed information to a plurality of the other members of the group, in order to request the plurality of the other members of the group to authenticate the transport mission.

18. An autonomous vehicle comprising a control device, for authenticating transport missions, where the control device is a control device of a member of a group comprising a plurality of autonomous vehicles and an off-board system, wherein each member in the group comprises a cryptographic function known by all other members, wherein the control device is configured to perform the following operations:
- receiving, from a member in the group, signed information defining at least one transport mission to be performed by at least one of the autonomous vehicles in the group, wherein the signed information comprises a history of authenticated transport missions combined with the new transport mission; and
- verifying the authenticity of the transport mission, using the cryptographic function.

* * * * *